(12) United States Patent
Ho et al.

(10) Patent No.: US 11,632,229 B2
(45) Date of Patent: Apr. 18, 2023

(54) SIGNAL TRANSCEIVER CIRCUIT, METHOD OF OPERATING SIGNAL TRANSMITTING CIRCUIT, AND METHOD OF SETTING DELAY CIRCUIT

(71) Applicant: REALTEK SEMICONDUCTOR CORPORATION, Hsinchu (TW)

(72) Inventors: Hsuan-Ting Ho, Hsinchu (TW); Liang-Wei Huang, Hsinchu (TW); Yang-Bang Li, Hsinchu (TW); Chia-Lin Chang, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 17/469,925

(22) Filed: Sep. 9, 2021

(65) Prior Publication Data
US 2022/0200778 A1    Jun. 23, 2022

(30) Foreign Application Priority Data

Dec. 23, 2020    (TW) .................................. 109145669

(51) Int. Cl.
*H04B 3/00* (2006.01)
*H04L 25/00* (2006.01)
*H04L 7/00* (2006.01)

(52) U.S. Cl.
CPC .................................. *H04L 7/0037* (2013.01)

(58) Field of Classification Search
CPC .................................. H04L 7/0037; H04B 3/23
USPC ................ 375/219, 220, 257, 258, 229, 346
See application file for complete search history.

(56) References Cited

U.S. PATENT DOCUMENTS

| | | | | |
|---|---|---|---|---|
| 7,720,015 B2 * | 5/2010 | Gupta | ...................... | H04B 3/23 370/286 |
| 2004/0120391 A1 | 6/2004 | Lin et al. | | |

OTHER PUBLICATIONS

OA letter of the counterpart TW application mailed on Aug. 23, 2021. Summary of the OA letter: Claims 1-7 are rejected under Patent Law Article 22(2) as being unpatentable over reference 1 (US 2004/0120391 A1).

* cited by examiner

*Primary Examiner* — Phuong Phu
(74) *Attorney, Agent, or Firm* — WPAT, P.C

(57) ABSTRACT

A signal transceiver circuit, a method of operating a signal transmitting circuit, and a method of setting a delay circuit are provided. The signal transceiver circuit is used to send an output signal and receive an input signal, and includes: a delay circuit for delaying a first clock to generate a second clock; a first digital-to-analog converter (DAC) for converting a first digital signal into the output signal according to the first clock; a second DAC for converting the first digital signal into an echo cancellation signal according to the second clock; an analog front-end circuit for receiving the input signal and the echo cancellation signal and generating an analog signal; and an analog-to-digital converter (ADC) for converting the analog signal into a second digital signal.

3 Claims, 6 Drawing Sheets

US 11,632,229 B2

SIGNAL TRANSCEIVER CIRCUIT, METHOD OF OPERATING SIGNAL TRANSMITTING CIRCUIT, AND METHOD OF SETTING DELAY CIRCUIT

BACKGROUND OF THE INVENTION

1. Field of the Invention

The present invention generally relates to signal transceiver circuits, and, more particularly, to the reduction or elimination of hybrid echo in the signal transceiver circuits.

2. Description of Related Art

In the conventional signal transceiver circuit, the signal receiving end usually receives unwanted echoes that come from the signal transmitting end and are closely related to the output signals transmitted by the signal transmitting end. An echo cancellation circuit that cancels the echoes according to the echo cancellation signal provided by the signal transmitting end is usually implemented in the signal receiving end. Generally, in practical circuits, there is a physical distance (i.e., the first physical distance) between the circuit that generates the output signals and the signal receiving end, and there is another physical distance (i.e., the second physical distance) between the circuit that generates the echo cancellation signals and the signal receiving end. Unfortunately, because the first physical distance is not exactly identical to the second physical distance, there is a phase difference between the echoes and echo cancellation signals, leading to hybrid echoes at the signal receiving end. An excessive hybrid echo degrades the performance of the signal transceiver circuit or the system that uses the signal transceiver circuit, or even causes some unexpected errors. Therefore, a circuit or method is needed to suppress or cancel the hybrid echoes.

SUMMARY OF THE INVENTION

In view of the issues of the prior art, an object of the present invention is to provide a signal transceiver circuit, a method of operating a signal transmitting circuit, and a method of setting a delay circuit, so as to make an improvement to the prior art.

According to one aspect of the present invention, a signal transceiver circuit for transmitting an output signal and receiving an input signal is provided. The signal transceiver circuit includes a delay circuit, a first digital-to-analog converter (DAC), a second DAC, an analog front-end circuit, and an analog-to-digital converter (ADC). The delay circuit is configured to delay a first clock to generate a second clock. The first DAC is configured to convert a first digital signal into the output signal according to the first clock. The second DAC is coupled to the delay circuit and configured to convert the first digital signal into an echo cancellation signal according to the second clock. The analog front-end circuit is configured to receive the input signal and the echo cancellation signal and generate an analog signal. The ADC is coupled to the analog front-end circuit and configured to convert the analog signal into a second digital signal.

According to another aspect of the present invention, a method of setting a delay circuit is provided. The delay circuit is used in a signal transceiver circuit and delays a first clock according to a delay parameter to generate a second clock, the signal transceiver circuit includes a first digital-to-analog converter (DAC), a second DAC, and an analog-to-digital converter (ADC), the first DAC operates according to the first clock, the second DAC operates according to the second clock, and the ADC generates a digital signal. The method includes the following steps: (A) setting the delay parameter of the delay circuit; (B) measuring a power of the digital signal at a plurality of phases to be measured to generate a plurality of measured powers; (C) calculating an average power of the measured powers, wherein the average power corresponds to the delay parameter; (D) repeating steps (A) to (D) to generate a plurality of average powers; and (E) setting the delay circuit with the delay parameter corresponding to a minimum value of the average powers.

According to still another aspect of the present invention, a method of operating a signal transmitting circuit is provided. The signal transmitting circuit transmits an output signal and includes a delay circuit, a first digital-to-analog converter (DAC), and a second DAC. The method includes the following steps: providing a first clock to the delay circuit and the first DAC; converting, by the first DAC, a digital signal into the output signal according to the first clock; delaying, by the delay circuit, the first clock to generate a second clock; providing the second clock to the second DAC; and converting, by the second DAC, the digital signal into an echo cancellation signal according to the second clock.

These and other objectives of the present invention no doubt become obvious to those of ordinary skill in the art after reading the following detailed description of the preferred embodiments with reference to the various figures and drawings.

DETAILED DESCRIPTION OF THE EMBODIMENTS

The following description is written by referring to terms of this technical field. If any term is defined in this specification, such term should be interpreted accordingly. In addition, the connection between objects or events in the below-described embodiments can be direct or indirect provided that these embodiments are practicable under such connection. Said "indirect" means that an intermediate object or a physical space exists between the objects, or an intermediate event or a time interval exists between the events.

The disclosure herein includes a signal transceiver circuit, a method of operating the signal transmitting circuit, and a method of setting a delay circuit. On account of that some or all elements of the signal transceiver circuit could be known, the detail of such elements is omitted provided that such detail has little to do with the features of this disclosure, and that this omission nowhere dissatisfies the specification and enablement requirements. Some or all of the processes of the method of setting the delay circuit may be implemented by software and/or firmware. A person having ordinary skill in the art can choose components or steps equivalent to those described in this specification to carry out the present invention, which means that the scope of this invention is not limited to the embodiments in the specification.

Figure 1:
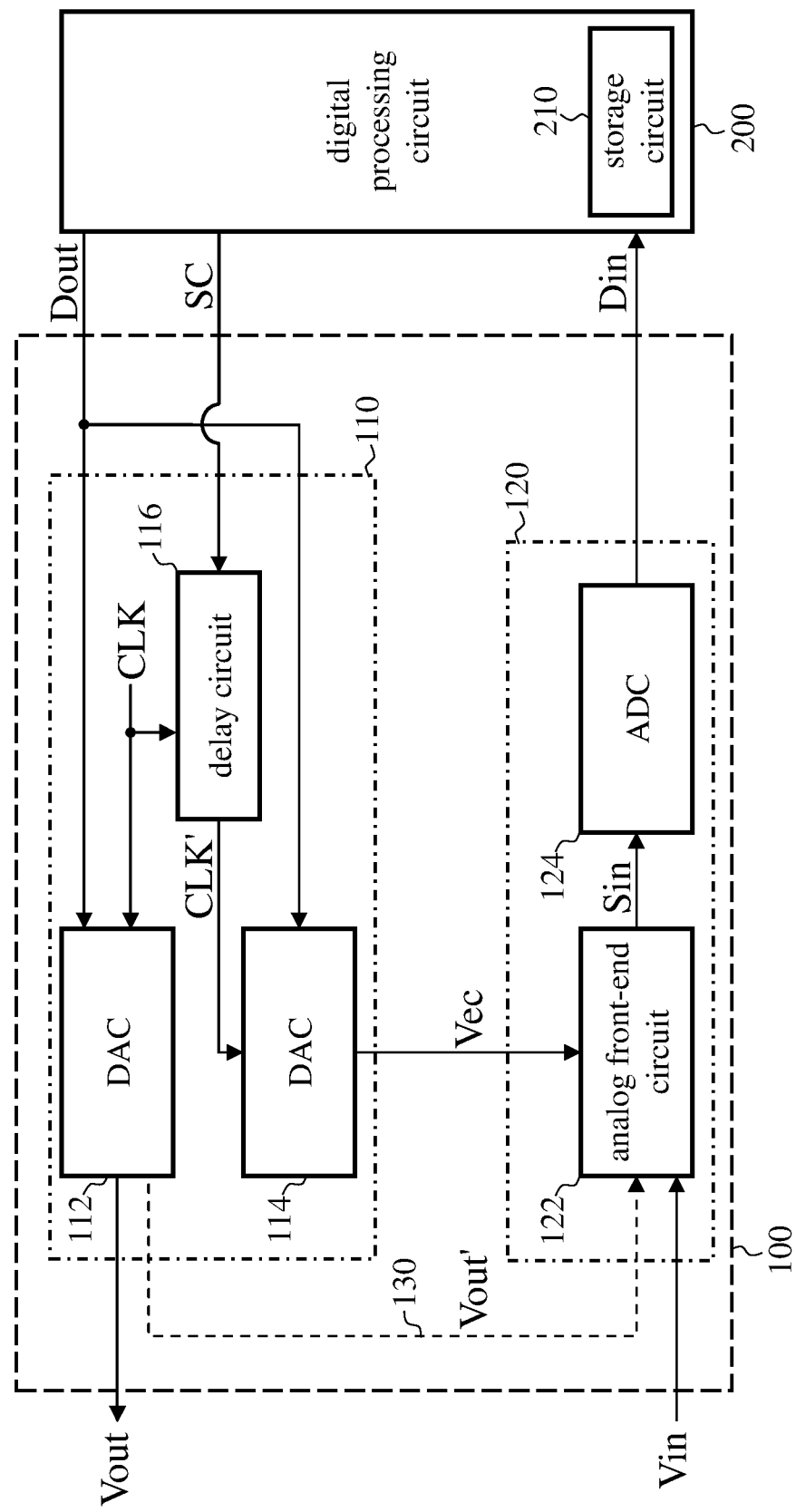
FIG. 1 illustrates a functional block diagram of the signal transceiver circuit according to an embodiment of the present invention.

FIG. 1 is a functional block diagram of the signal transceiver circuit according to an embodiment of the present invention. The signal transceiver circuit 100 is coupled to the digital processing circuit 200. The digital output signal Dout generated by the digital processing circuit 200 is converted into an output signal Vout and then transmitted (e.g., through an antenna) by the signal transceiver circuit 100. The signal transceiver circuit 100 receives an input signal Vin from the outside (e.g., via an antenna) and then generates a digital input signal Din accordingly.

The signal transceiver circuit 100 includes a signal transmitting circuit 110 and a signal receiving circuit 120. The signal transmitting circuit 110 includes a digital-to-analog converter (DAC) 112, a DAC 114, and a delay circuit 116. The signal receiving circuit 120 includes an analog front-end circuit 122 and an analog-to-digital converter (ADC) 124.

The DAC 112 operates according to the clock CLK to convert the digital output signal Dout generated by the digital processing circuit 200 into the output signal Vout. The echo Vout' of the output signal Vout is transmitted to the analog front-end circuit 122 of the signal receiving circuit 120 through the echo path 130. The DAC 114 operates according to the clock CLK' to convert the digital output signal Dout into the echo cancellation signal Vec. The analog front-end circuit 122 is used to process the input signal Vin (such as amplification, frequency down-conversion, etc.). The analog front-end circuit 122 also uses the echo cancellation signal Vec to cancel the echo Vout', so as to reduce the interference of the echo Vout' on the input signal Vin. (i.e., to ideally make the echo Vout' disappear from the analog signal Sin). The ADC 124 is used to convert the analog signal Sin into the digital input signal Din.

The delay circuit 116 delays the clock CLK to generate the clock CLK'. The digital processing circuit 200 controls the delay parameters of the delay circuit 116 by means of the control signal SC. For example, the delay circuit 116 may include a capacitor array and a plurality of switches, the ON/OFF states of which are controlled by the control signal SC and determine the number of capacitors connected in series and/or parallel (i.e., to determine the equivalent capacitance value of the capacitor array), and the equivalent capacitance value of the capacitor array (i.e., the delay parameter of the delay circuit 116) is associated with the delay amount of the delay circuit 116.

In some cases, the position of the DAC 114 in the practical circuit is closer to the analog front-end circuit 122 than the DAC 112, resulting in a phase difference between the echo Vout' and the echo cancellation signal Vec, which in turn causes the hybrid echo in the signal receiving circuit 120. A solution to this issue is to use the delay circuit 116 to delay the clock CLK so that the clock CLK' lags behind the clock CLK (i.e., the phase of the clock CLK' is behind the phase of the clock CLK). "Causing the phase of the clock CLK' to be behind the phase of the clock CLK" is equivalent to "delaying the echo cancellation signal Vec of the DAC 114 relative to the output signal Vout of the DAC 112." As a result, the phase difference between the echo Vout' and the echo cancellation signal Vec in the signal receiving circuit 120 becomes smaller (compared to the case where the DAC 112 and the DAC 114 operate according the same clock), which effectively reduces the hybrid echo.

The details of the delay circuit 116 are well known to people having ordinary skill in the art know and are thus omitted for brevity. In some embodiments, the delay circuit 116 may be embodied by a phase interpolator, which performs phase interpolation on the clock CLK (i.e., performs phase interpolation according to the clock CLK) to generate the clock CLK'. In other words, the phase interpolator achieves the effect of delaying the clock CLK by phase interpolation. Controlling the phase interpolator through the digital control signal SC is well known to people having ordinary skill in the art, and the details are thus omitted for brevity. Visit the website for more details: iram.cs-.berkeley.edu/serialio/cs254/interpolator/interp.html.

Figure 2:
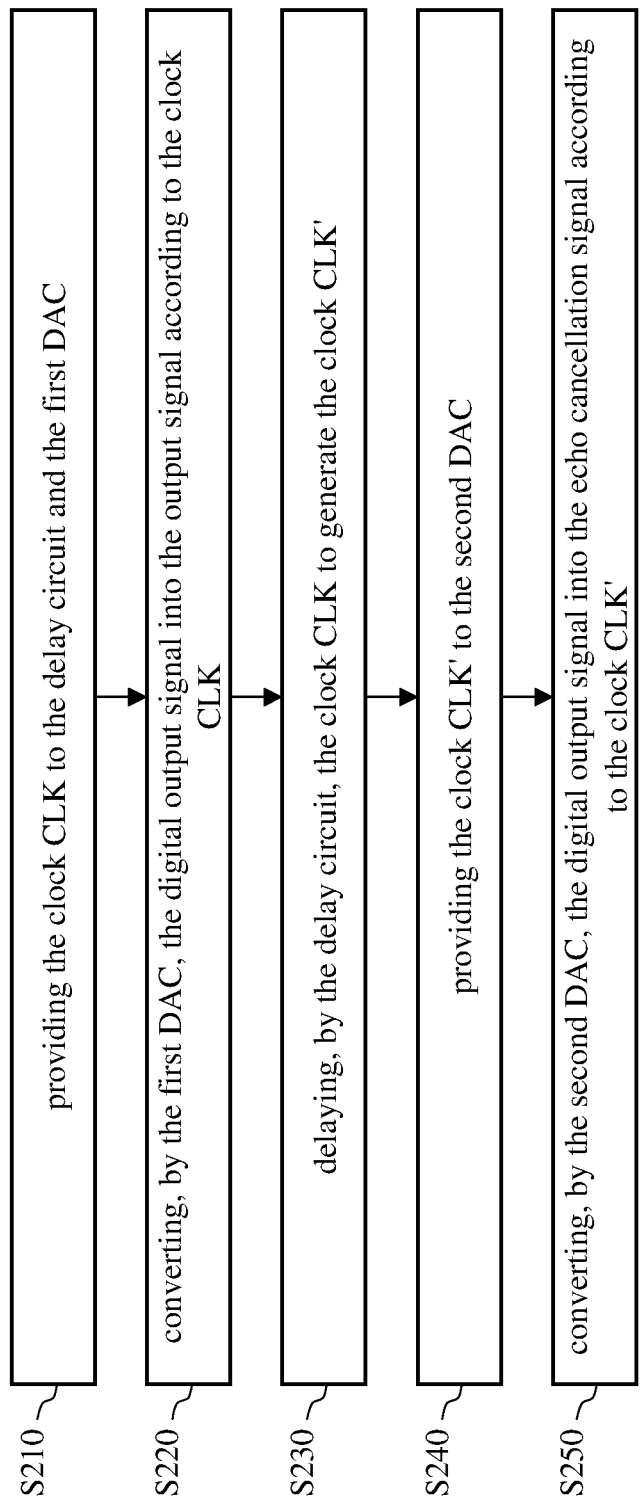
FIG. 2 illustrates a flowchart of the method of operating the signal transmitting circuit according to the present invention.

Reference is made to FIG. 2, which shows a flowchart of the method of operating the signal transmitting circuit according to the present invention. The method includes the following steps.

Step S210: providing the clock CLK to the delay circuit 116 and the DAC 112 (i.e., the first DAC).

Step S220: converting, by the DAC 112, the digital output signal Dout into the output signal Vout according to the clock CLK.

Step S230: delaying, by the delay circuit 116, the clock CLK to generate the clock CLK'. For the phase interpolator, generating the clock CLK' by interpolation according to the clock CLK is equivalent to generating the clock CLK' by delaying the clock CLK.

Step S240: providing the clock CLK' to the DAC 114 (i.e., the second DAC).

Step S250: converting, by the DAC 114, the digital output signal Dout into the echo cancellation signal Vec according to the clock CLK'.

Figure 3:
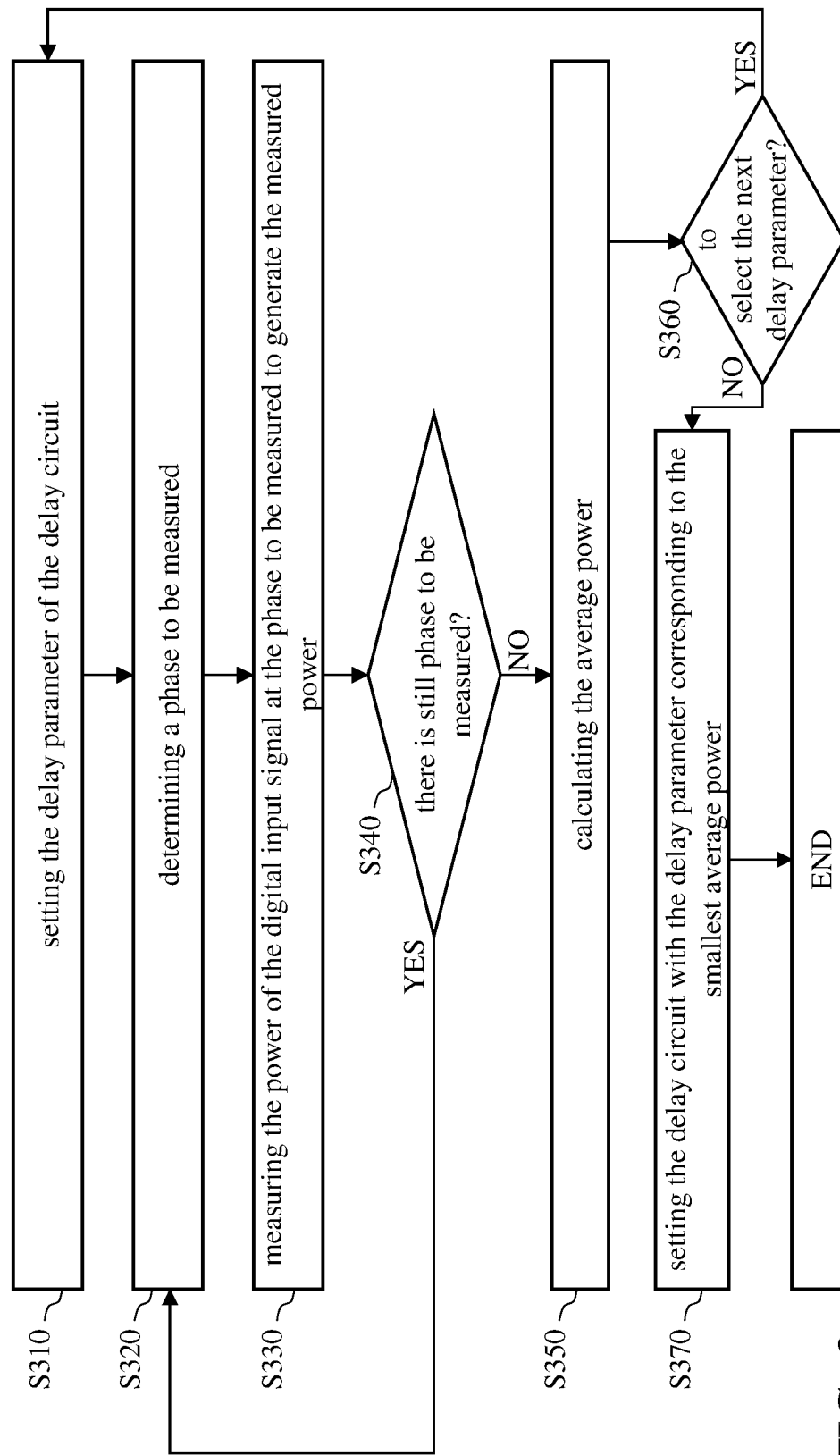
FIG. 3 illustrates a flowchart of the method of setting a delay circuit according to the present invention.

The determination of the delay parameter of the delay circuit 116 is discussed below. Reference is made to FIG. 3, which is a flowchart of the method of setting the delay circuit according to the present invention. The method includes the following steps.

Step S310: setting the delay parameter of the delay circuit 116. For example, in this step, the digital processing circuit 200 controls the equivalent capacitance value of the delay circuit 116 through the control signal SC. For another example, when the delay circuit 116 is embodied by a phase interpolator, the embodiment of this step can be that the digital processing circuit 200 controls the internal switches of the phase interpolator through the control signal SC.

Step S320: determining, by the digital processing circuit 200, a phase to be measured.

Step S330: measuring, by the digital processing circuit 200, the power of the digital input signal Din at the phase to be measured to generate the measured power corresponding to the phase to be measured.

Step S340: determining, by the digital processing circuit 200, whether the phases to be measured are all processed. In some embodiments, the digital processing circuit 200 measures the power of the digital input signal Din at multiple phases to be measured within the symbol duration time of the digital input signal Din; the symbol duration time is the reciprocal of the symbol rate of the digital input signal Din. For example, when the digital processing circuit 200 is set to measure the power of the digital input signal Din at N phases to be measured (N being a positive integer), the digital processing circuit 200 performs steps S320 and S330 N times and thus obtain N measured powers accordingly which correspond respectively to the N phases to be measured. When there is no unprocessed to-be-measured phase (the result of step S340 is NO), the digital processing circuit 200 performs step S350.

Step S350: calculating, by the digital processing circuit 200, the average of the N measured powers. The average power generated in this step corresponds to the delay parameter set in step S310. In other words, a delay parameter corresponds to an average power.

Step S360: determining, by the digital processing circuit 200, whether to continue setting the delay parameter of the delay circuit 116. For example, if the physical distance difference between the DAC 112 and the DAC 114 is approximately equivalent to the range of zero ps (picosecond) to 250 ps, and the delay resolution of the delay circuit 116 is 2.5 ps, then the digital processing circuit 200 sets the delay circuit 116 with M delay parameters which correspond to the delay time of 2.5 ps, 5.0 ps, . . . , 247.5 ps, and 250 ps, respectively (M being an integer and 1≤M≤100). When all the delay parameters have been used (i.e., the digital processing circuit 200 does not select the next delay parameter, the result of step S360 being NO), the digital processing circuit 200 performs step S370; otherwise, the digital processing circuit 200 performs step S310.

Step S370: determining, by the digital processing circuit 200, the final delay parameter for the delay circuit 116. More specifically, the digital processing circuit 200 determines the minimum of the M average powers, takes the delay parameter corresponding to the minimum average power as the final delay parameter, and then uses the final delay parameter to set the delay circuit 116.

As discussed above, the flow of FIG. 3 can determine a better delay parameter for the delay circuit 116 so that the power of the digital input signal Din is relatively small (i.e., the hybrid echo that the digital input signal Din contains is relatively small). In some embodiments, the digital processing circuit 200 embodies the flow of FIG. 3 by means of a finite state machine (FSM). In other embodiments, the digital processing circuit 200 is a circuit with program execution capability, and the digital processing circuit 200 executes program codes or program instructions, which, for example, are stored in the storage circuit 210 of the digital processing circuit 200, to perform the flow of FIG. 3.

Figure 4A:
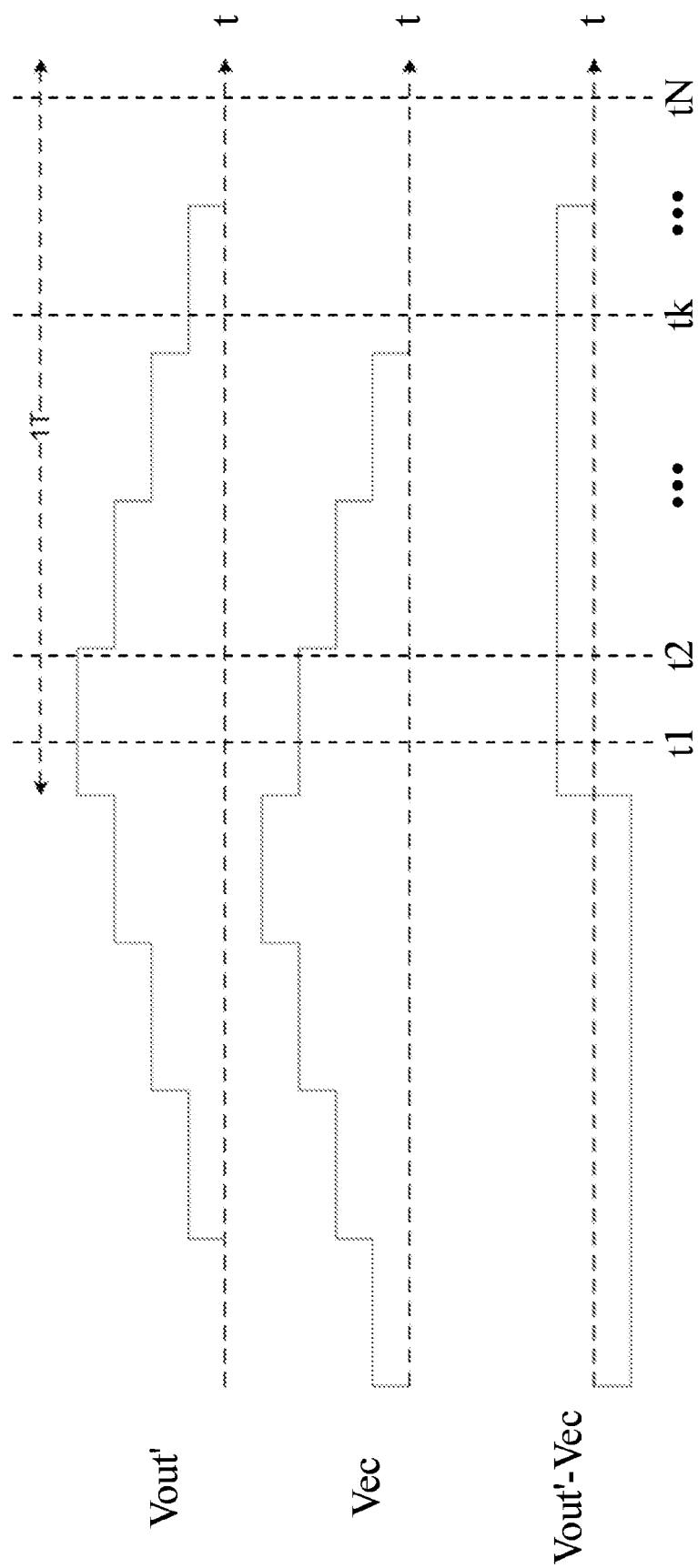
FIGS. 4A-4C show the waveforms of the echo Vout', the echo cancellation signal Vec, and the hybrid echo.
Figure 4B:
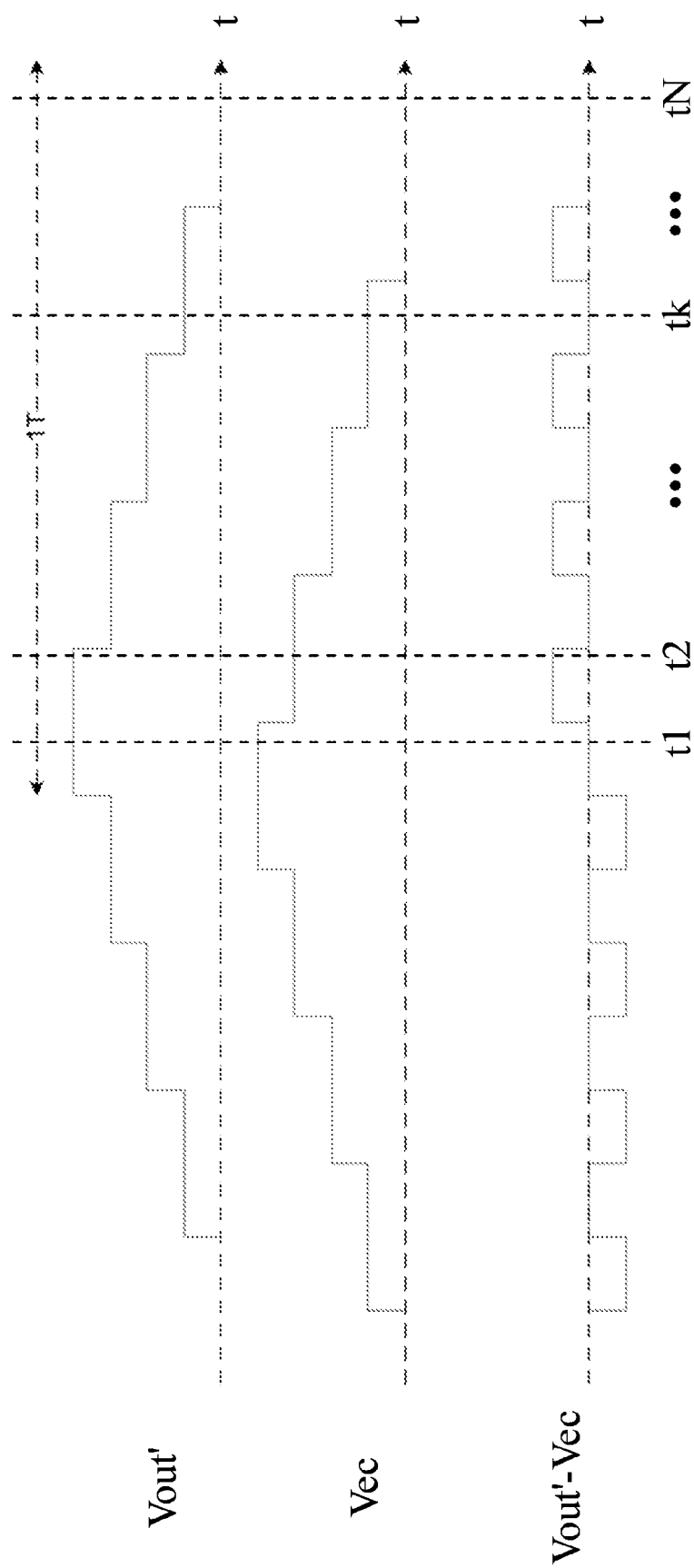
Figure 4C:
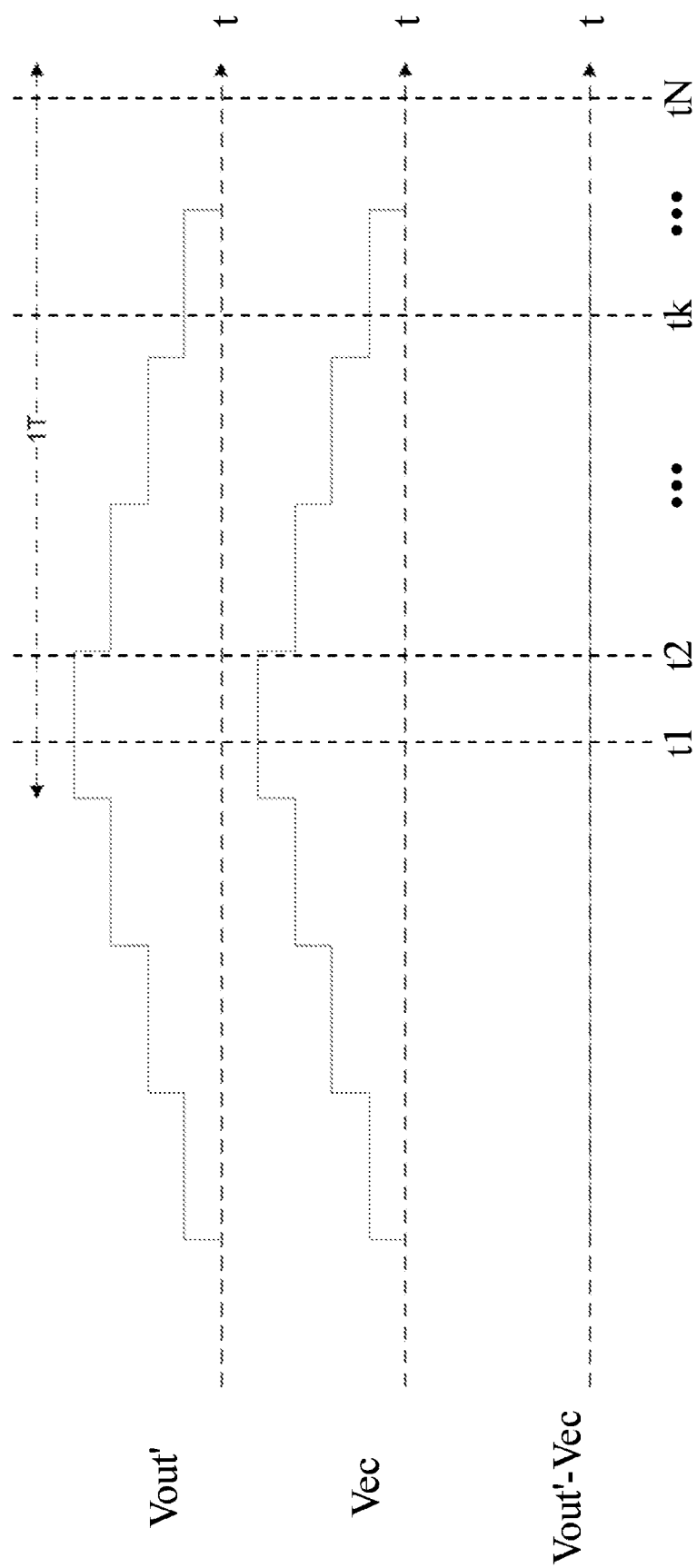

Reference is made to FIGS. 4A-4C which show waveforms of the echo Vout', the echo cancellation signal Vec, and the hybrid echo (i.e., Vout'-Vec). FIGS. 4A-4C correspond to different delay parameters (i.e., FIGS. 4A-4C each have its own average power). In FIGS. 4A-4C, "T" represents the symbol duration time of the digital input signal Din, and the time points t1, t2, . . . , tk, . . . , tN each correspond to a phase to be measured (1≤k≤N). As shown in FIG. 4B, the amplitude of the hybrid echo corresponding to the time point t1 is zero, and the amplitude of the hybrid echo corresponding to the time point t2 is not zero. It can be observed that if steps S320 and S330 are performed only once, there may be misjudgment due to the low sampling rate which may be accompanied by aliasing; that is, for example, if the power is measured at the time point t1, the measured power will be smaller, which leads to the erroneous conclusion that the hybrid echo is relatively small. The purpose of the flow in FIG. 3 is to find the delay parameter corresponding to a relatively small hybrid echo. When the delay resolution of the delay circuit 116 is high enough, the flow of FIG. 3 can ideally find the final delay parameter that makes the echo Vout' substantially align with the echo cancellation signal Vec (i.e., the phase difference between the two is substantially zero, as shown in FIG. 4C).

In summary, the present invention overcomes or offsets the signal delay caused by the signal path difference on the physical circuit by delaying the clock of the DAC. Therefore, a better echo cancellation effect can be obtained; that is, the hybrid echo becomes smaller in amplitude or power. As a result, the signal transceiver circuit of the present invention has better performance.

Since a person having ordinary skill in the art can appreciate the implementation detail and the modification thereto of the present method invention through the disclosure of the device invention, repeated and redundant description is thus omitted. Please note that the shape, size, and ratio of any element in the disclosed figures are exemplary for understanding, not for limiting the scope of this invention. Furthermore, there is no step sequence limitation for the method inventions as long as the execution of each step is applicable. In some instances, the steps can be performed simultaneously or partially simultaneously.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. A method of setting a delay circuit, wherein the delay circuit is used in a signal transceiver circuit and delays a first clock according to a delay parameter to generate a second clock, the signal transceiver circuit comprises a first digital-to-analog converter (DAC), a second DAC, and an analog-to-digital converter (ADC), the first DAC operates according to the first clock, the second DAC operates according to the second clock, and the ADC generates a digital signal, the method comprising:

(A) setting the delay parameter of the delay circuit;
(B) measuring a power of the digital signal at a plurality of phases to be measured to generate a plurality of measured powers;
(C) calculating an average power of the measured powers, wherein the average power corresponds to the delay parameter;
(D) repeating steps (A) to (D) to generate a plurality of average powers; and
(E) setting the delay circuit with the delay parameter corresponding to a minimum value of the average powers.

2. The method of claim 1, wherein the phases to be measured are a plurality of phases within a symbol duration time of the digital signal.

3. The method of claim 1, wherein the delay circuit is a phase interpolator.

* * * * *